July 14, 1953   D. HESTER   2,645,388
LIQUID DISPENSER
Filed June 25, 1947   3 Sheets-Sheet 1
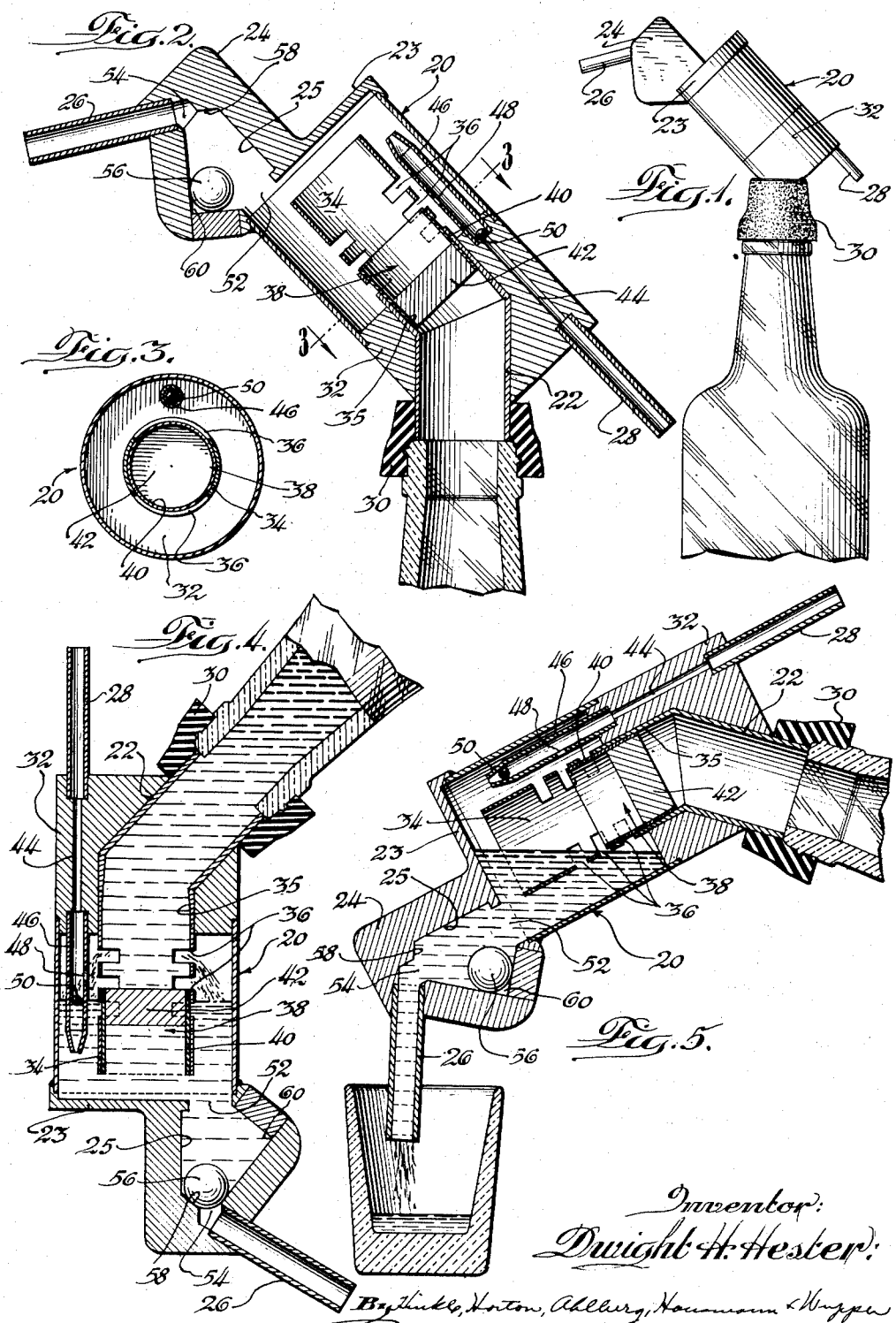
Inventor:
Dwight H. Hester

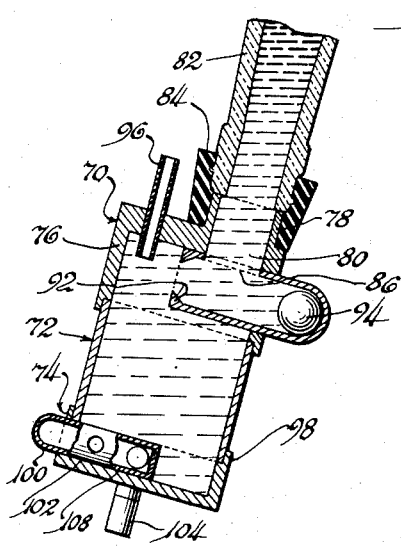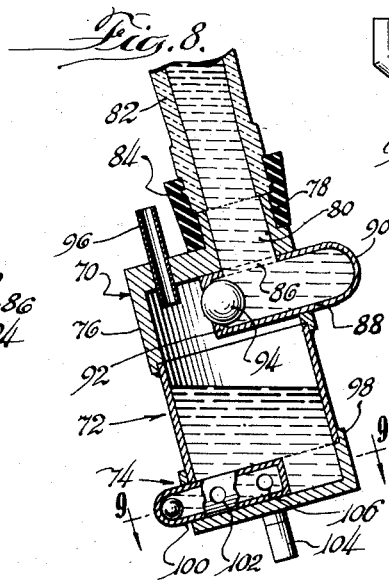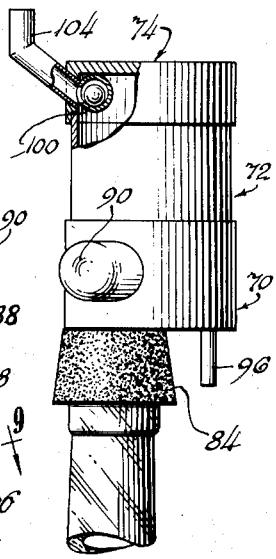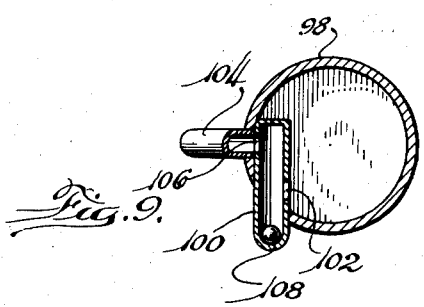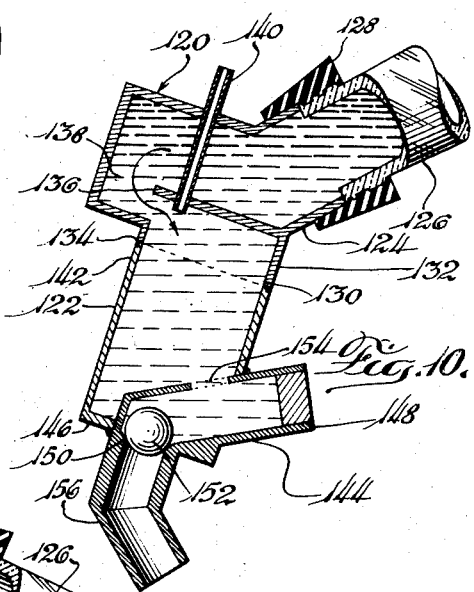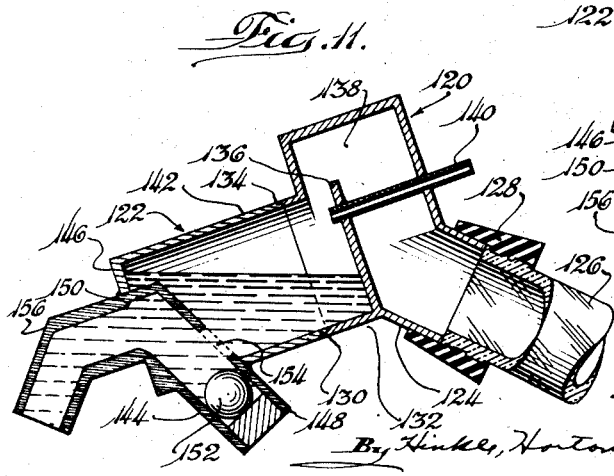

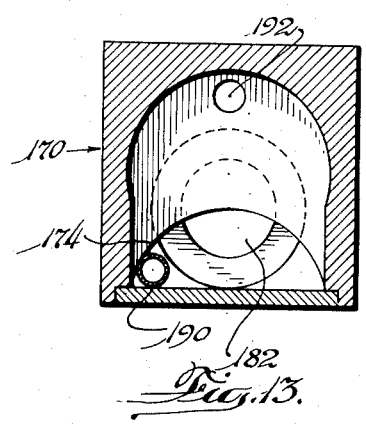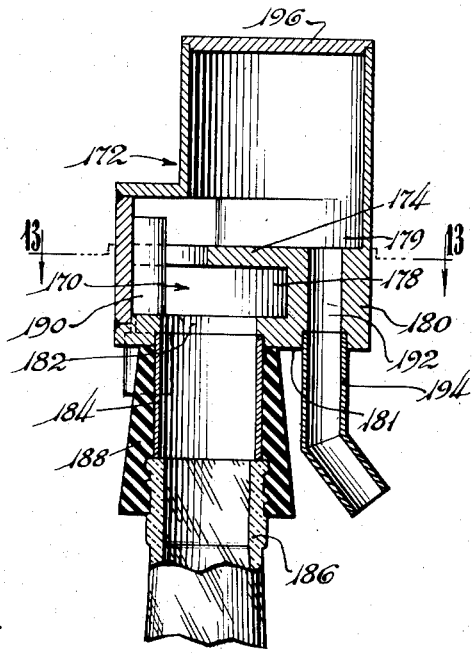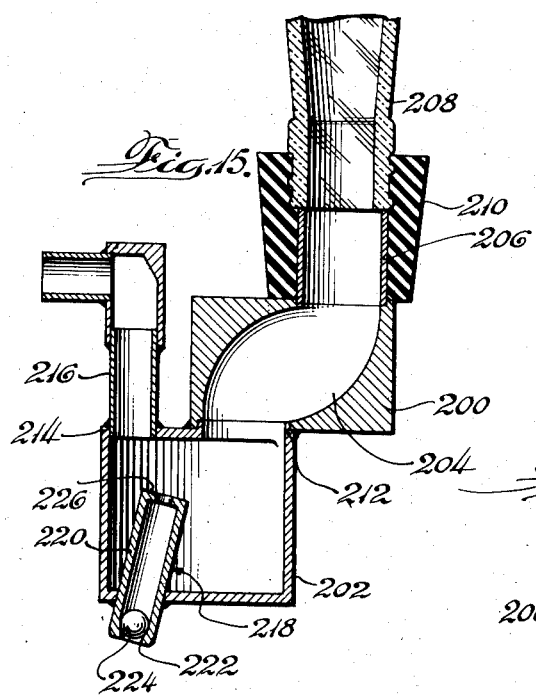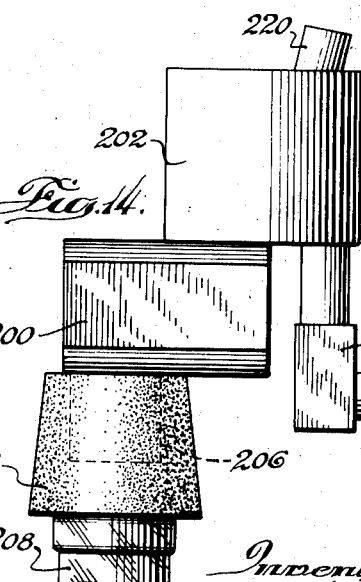

Patented July 14, 1953

2,645,388

UNITED STATES PATENT OFFICE 2,645,388

LIQUID DISPENSER

Dwight Hester, Chicago, Ill.

Application June 25, 1947, Serial No. 756,982

8 Claims. (Cl. 222—454)

1

My invention relates to a dispensing device which may be used to dispense a measured quantity of liquid from a bottle.

In serving liquor, partcularly liquor of the whiskey type, it is customary to serve a measured quantity within the range of 3/4 ounce to 1 1/2 ounces. Bars and restaurants usually serve this liquor in small glasses which are cast or formed to hold a predetermined amount. It is, however, relatively easy to substitute glasses having the same outer dimensions but smaller inner dimensions for those used. In this manner the customer is usually cheated of a full measure of liquor. Furthermore, these glasses often must be used in preparing mixed drinks which means extra glasses for each drink.

Automatic measuring devices have been known prior to my invention consistsing of a unit which fits on the top of a liquor bottle. Some of these, however, make use of an air inlet tube and a liquid outlet tube, both of which extend into the bottle, thus restricting the diameter of each of these tubes and the effective flow passage from the bottle. It necessarily follows that an appreciable amount of time must be taken to fill the device and to provide for the replacement of liquid with air in the bottle.

It is the principal object of the present invention to provide a novel measuring dispenser which will deliver a predetermined measured amount of liquor from a bottle in a much shorter time than has been heretofore possible.

Another object of my invention is to provide a novel measuring dispenser which will deliver a predetermined measured amount of liquor from a bottle and which is detachably mounted to the mouth of the bottle.

Another object is to provide a novel measuring dispenser which is readily attached to any type and size of liquor bottle.

Another object is to provide a novel measuring dispenser which is easy to use and which requires a minimum number of movements to use.

Another object is to provide a novel measuring dispenser which may be used to deliver two different predetermined amounts of liquor.

Another object is to provide a novel measuring dispenser which is simple in construction, easily assembled and has a minimum number of parts.

Another object is to provide a novel dispenser which is attractive in appearance and may be used as an advertising item.

Another object is to provide a novel dispenser which does not leak.

Other objects and advantages will become apparent from the following description taken in conjunction with the accompanying drawings, in which:

Fig. 1 is an elevational view of one form of my invention secured to the top of a conventional liquor containing bottle;

Fig. 2 is a medial cross-sectional view on an enlarged scale showing the internal construction and the relative position of the parts in rest position when the bottle is standing upright;

Fig. 3 is a cross-sectional view through the dispenser and may be considered as being taken substantially along the line 3—3 of Fig. 2, looking in the direction of the arrows;

Fig. 4 is a cross-sectional view showing the position in which the bottle is held while the dispenser is being filled, illustrating the relative positions of the parts during a filling operation;

Fig. 5 is a cross-sectional view showing the position in which the bottle is held while the liquid is poured from the dispenser;

Fig. 6 is an elevational view of a modified form of my invention;

Fig. 7 is a cross-sectional view of this form taken through the dispenser on the axis of the bottle while in filling position, showing the positions of the parts;

Fig. 8 is a cross-sectional view similar to Fig. 7 showing the relative positions of the parts when the dispenser is in pouring position;

Fig. 9 is a cross-sectional view through the dispenser taken along line 9—9 of Figs. 6 and 8, looking in the direction of the arrows;

Fig. 10 is a cross-sectional view of another form of my invention showing the position of the parts when the dispenser is in the filling position;

Fig. 11 is a view similar to Fig. 10 when the dispenser is in the pouring position;

Fig. 12 is a cross-sectional view of another form of my invention taken along the axis of the bottle;

Fig. 13 is a cross-sectional view of the dispenser taken along the line 13—13 of Fig. 12, looking in the direction of the arrows;

Fig. 14 is an elevational view of another form of my invention; and

Fig. 15 is a cross-sectional view of the modification shown in Fig. 14 taken on the axis of the bottle showing the dispenser in filling position.

Referring to Figs. 1 to 5, my novel dispenser is shown generally to comprise a container 20, an inlet 22, an outlet head 24, an outlet tube 26, and an air vent 28. The inlet 22 is a cylindrical member or tube projecting from the container 20 at an angle of about 45 degrees. It is about 3/4 inch in diameter so as to be sufficiently large to equal or exceed the normal mouth opening of a liquor bottle. The dispenser is attached to the bottle by a collar 30 of rubber or resilient material which may be slipped onto the bottle around the mouth thereof and the inlet tube 22 is inserted in the free end of the collar so that it abuts against the lip of the bottle. The inlet tube 22 leads into the container 20 through a relatively heavy base 32 which closes one end of the container 20. An extension 34 of the inlet tube is provided within the container, concentric with the walls of the container and extending well past the middle point thereof. A number of slots 36 are cut in the wall of this extension to provide communicating passages between the extension 34 and the interior of the container 20.

Mounted within the extension for free sliding movement therein is a cup-shaped buoyant or floating valve 38. The valve is composed of a piece of light weight cylindrical tubing 40 with one end thereof closed by a cork or wax plug 42. The diameter of this floating valve 38 is as large as is compatible with free sliding motion within the extension 34. The extension is tapered inwardly at 35 to form a valve seat for the valve 38 adjacent the juncture between the extension 34 and the inlet tube 22.

Also in the container is an air vent leading exteriorly thereof. It consists of the external tube 28 communicating with a passage 44 through the base 32 which in turn communicates with an internal tube 46 seated in the base 32 and lying parallel to the extension 34. The tube 46 has a port 48 whereby it communicates with the interior of the container 20. Contained in the internal tube 46 is a movable baffle or valve member 50 preferably taking the form of a small floating ball of cork or other similar material to prevent escaping air from carrying liquid with it and splashing out of the dispenser through the vent.

The outlet head 24 is a substantially triangularly shaped element with parallel sides, having a similarly shaped recess 25, open at two apices of the triangle. It includes an integral circular flanged portion 23 which closes the upper end of the container 20. One of these openings 52 communicates with the interior of the container 20. The other opening 54 leads to the outlet tube 26 which is seated in the head 24. A metal ball valve 56 is enclosed within the recess 25 and is of such a size that when the ball rests in the third angle 60 the flow through the recess 25 and tube 26 is substantially unimpeded. The edge 58 of opening 54 is formed in such fashion that when ball valve 56 closes the opening 54 there is a liquid-tight seal. The outlet tube 26 is mounted in the outlet head in communicating relation with opening 54 and projects from said head at an angle of about 50 degrees to the line of the container. The angles of the inlet to the container and the outlet from the container are such that the total enclosed angle between the center lines of the inlet tube and the outlet tube is slightly less than 90 degrees. This arrangement insures that the valve at the outlet will be closed during the filling operation and that the container will be emptied during a pouring operation.

When it is desired to dispense a measured quantity of liquid, the bottle with the dispenser secured to its top is turned to the filling position with the container 20 generally vertical (Fig. 4). The floating valve 38 falls, forced by its own weight and the weight of the liquid in the bottle, to the open end of the extension and against the head portion 23. The ball valve rolls into the valve seat 58 to close the outlet port 54. The liquid flows from the bottle through the inlet tube 22, extension 34 and slots 36 into the container 20. As this passage is relatively open and not restricted, air will bubble through the flowing liquid to displace the liquid in the bottle. During this operation the weight and force of the flowing liquid will keep the valve 38 from seating and closing the inlet. However, as soon as the container is filled, the valve 38 will rise and seat against the tapered valve seat 35 in the extension 34. The bottle is then moved to pouring position (Fig. 5) whereupon the ball valve 56 rolls away from its seat 58 into the angle 60 of the recess 25. In this position the bottom of the bottle is lower than the mouth so that there is no liquid pressure against the top of floating valve 38. The outlet being uncovered, the liquid will drain out and air will flow in through the air vent to permit a smooth flow of the liquid. Backward flow is prevented by valve 38 which has been moved to closed position as described.

It will be noted that this form of the invention can be employed in a different fashion to deliver a lesser measured quantity of liquid. If after filling the container 20 the bottle is placed in such position that the air vent points downwardly, the liquid will drain from it, the air vent and outlet 26 respectively reversing their functions. The ball valve 56 will roll from the seat 58 to the opening 52. Since the ball valve 56 does not form an airtight seal with the opening 52, air may enter to allow free flow of the liquid. The liquid will drain through the port 48, tube 46, passage 44 and tube 28 into the waiting glass. The cork ball baffle 50 is of such size that it will not appreciably restrict the flow of the liquid, having a diameter smaller than that of the tube 46. When the level of the liquid is down to the bottom of the port 48 the flow will cease and the measure will be reduced by the amount of liquid remaining in the dispenser. The size of this lesser measure can be adjusted by varying the position of the port 48 on the internal tube 46.

The second form of my invention as shown in Figs. 6 to 9 is composed of a base 70, a cylindrical wall 72 and a head 74. The base is a thick circular plate having a cylindrical rim 76 projecting from one side in which the cylindrical wall 72 is seated. A protruding cylindrical flange 78 is formed on the other side of the base plate 70 near its periphery and approximately equal in diameter to the mouth opening of a conventional liquor bottle. This flange is coextensive with and serves to define an opening 80 in the base 70 and forms the inlet to the container. This inlet is coupled in abutting relation to the mouth of a bottle 82 by a collar 84 similar to the collar 30.

The other side of the opening 80 communicates with an opening 86 in a tube 88 inserted in the cylindrical rim 76 and projecting partially into and partially out of the container. The tube is closed at its outer end 90 and has a restricted opening forming a valve seat 92 at the inner end. It has within it a metallic ball valve 94 sufficiently small to roll freely within the tube and sufficiently large to seat on the valve seat 92 in liquid-tight relation. An air vent tube 96 open at both ends is inserted in the base 70 adjacent the flange 78, projecting partially into and partially out of the container.

The head 74 is composed of a circular rimmed plate, the rim 98 being adapted to seat the end of the cylindrical wall 72 opposite the base 70. A valve tube 100 closed at both ends is inserted in the rim 98 parallel to the outer end of the head 74 and to the tube 84 and, like tube 84, projects partially into and out of the container, the outwardly projecting part projecting in a direction nearly opposite to the tube 84. An opening 102 in the interior portion of the valve tube 100 connects the interior of the container with the interior of the tube 100. An angularly shaped outlet tube 104 communicates by opening 106 with the inner end of tube 100 and is inserted through the rim 98. The edge of opening 106 serves as a seat for a ball valve 108 which rolls in the valve tube 100 and, when in proper position, will seat in the opening 106 in liquidtight relation.

In operation the bottle with the dispenser fixed on it is inverted and tilted slightly so that the ball 94 will roll away from the seat 92 in the tube into the outwardly projecting end thereof. The liquid thereby flows freely from the bottle into the container, replacing the displaced liquid through the wide openings 86 and 92 and tube 84. When the dispenser is thus tilted, the valve 108 will close opening 106 and prevent escape of liquid through the outlet. When the container is filled the bottle is then tilted slightly to roll the ball 94 to close the restricted opening and seat on the valve seat 92 as shown in Fig. 8. When this is done the valve 108 will be rolled away from its position closing the restricted outlet opening 106 and the liquid will flow out through the outlet, displacing air entering through the air vent 84.

In the modification shown in Figs. 10 and 11 my dispenser is composed of a chamber indicated generally by numeral 120 and a container indicated generally by numeral 122. The chamber is a generally cylindrical member with a flanged opening on either plane side. The first flanged opening 124 hereinafter referred to as the inlet is in the edge of the chamber 120 and extends outwardly therefrom at an angle of about 45 degrees from the axis thereof. The diameter of this inlet is equal approximately to the mouth opening of a conventional liquor bottle and is secured in abutting relation to the mouth of a bottle 126 by a collar 128 of rubber-like material. The second flanged opening 130 is coextensive with the same portion 132 of the cylindrical wall of the chamber 120 from which the inlet projects. The flange 134 is adapted to receive the open end of the container 122. A baffle 136 is located interiorly of the chamber and is based on the cylindrical wall portion 132 and extends more than half way across the interior of the chamber, leaving a passageway 138 opposite wall portion 132.

An air vent tube 140 open at both ends is inserted in the plane wall from which the inlet 124 projects and passes through the baffle 136 to establish communication between the interior of the container 122 and the atmosphere.

The container 122 is a cylindrical body open at one end 142 and adapted at that end to seat on flange 134 of the chamber-forming member. An outlet valve tube 144 closed at one end 148 and having a restricted opening 150 at the other which constitutes a ball valve seat is inserted in that portion of the cylindrical wall of the container contiguous with the wall portion 132 of the chamber 120 and adjacent the outer end 146 of the container. The closed end 146 faces outwardly of the container.

A ball valve 152 rides freely in the tube 144 and, when seated on the ball valve seat 150, forms a liquidtight seal. An opening 154 is cut in tube 144 which communicates with the interior of the container 122. An extension 156 of the tube 144 passes through the head 146 of the container to form an outlet for the dispenser. The enclosed angle between the inlet and the outlet is equal approximately to 95 degrees.

In operation, the bottle with this dispenser mounted on it is inverted to the position shown in Fig. 10. The liquid flows from the bottle through the inlet 124 into the chamber 120, around the baffle 136 as indicated by arrow 158, and into the container 122. The valve 152 in the meantime has fallen into its seat 150 to close the outlet. When the container is filled, the bottle is moved to the position illustrated in Fig. 11. In this position the ball valve 152 falls to the closed end of the tube 142, thus opening the passage from the container into and through the tube 142 and the outlet 156 permitting the liquid to flow out. Backward flow of the enclosed liquid from the container into the bottle is prevented by the baffle 136. A smooth flow of the liquid is assured by air entering through the air vent 140.

In the form of the invention illustrated in Figs. 12 and 13 the dispenser comprises chamber 170 and container 172 both formed of a single piece of metal or plastic material. The chamber 170 is a rectangular element divided internally by a baffle 174 into an upper half 176 and a lower half 178 (Fig. 12). The baffle extends more than half way across the interior of the chamber and has an arcuate edge (Fig. 11). The lower half 178 has on one side a thick vertical wall 180 extending from lower wall 181 to the baffle 174. On the opposite side, there is an opening 182 in the lower wall 181 in which an inlet tube 184 having a diameter approximately equal to the mouth of a conventional liquor bottle is seated. The inlet is secured in abutting relation to the mouth of a bottle 186 by an elastic collar 188. The opening between the baffle 174 and the vertical wall of the chamber 170 is located generally above the inlet 184. An air vent tube 190 open at both ends is situated in the lower wall 181 adjacent the inlet 184 and extends interiorly through the chamber 170 and into the container 172.

A vertical passage 192 is formed in the thick vertical wall in the lower end of which a tube 194 is seated adjacent the inlet and on the opposite side of the dispenser from the vent tube 190. The tube and the passage thus provide communication between the upper half of the chamber and the container and the atmosphere to form the outlet.

The upper half 176 of the chamber communicates directly with the container 172 which is formed by a cylindrical element integral with the receiver and slightly smaller in diameter. The container is located noncentrically on the receiver so that the wall portion adjacent the outlet forms a continuous wall with the chamber wall. A cap 196 seats on and closes the upper end of the container.

In operation a bottle with the dispenser mounted thereon is tilted so that the bottom of the bottle is above the mouth and so that the outlet 194 of the dispenser is below the inlet 184. The liquid flows through the inlet into the receiver 178, around the baffle 174, and into the container 172. The bottle is then tilted back so that the bottom is lower than its mouth but with the outlet of the dispenser still below the inlet. The liquid will then drain through the outlet, the baffle 174 preventing back-flow of the liquid into the bottle, and the air vent 190 functions to admit air to displace the liquid flowing from the container.

In the form of the invention disclosed in Figs. 14 and 15 the dispenser comprises basically a block 200 and a container 202. The block 200 is rectangular and has a diagonal or S-shaped passage 204 cut through it between opposite sides. An inlet tube 206 of a diameter approximately equal to the mouth of a conventional liquor bottle is seated in one end of the passage 204. This inlet is secured in abutting relation to the mouth of a bottle 208 by an elastic collar 210. The other end of the diagonal passage is adapted to receive a flanged opening 212 of the container 202. The container is a cylindrical element having two plane ends. In one of these ends is the above referred to flanged opening. Adjacent this opening is another opening 214 in which an outlet tube 216 is inserted. The container is so oriented on the block 200 that the outlet 216 is at a maximum distance from the inlet 206.

An air vent 218 is mounted in the plane end of container 202 at a point opposite opening 216 and diagonally opposite opening 212. It consists of a tube 220 open at both ends and protruding partially into and partially out of the container. The external end has a restricted opening 222 which constitutes a valve seat for a ball valve 224. The internal end also has a restricted opening 226 which, however, is not a valve seat in that when the ball valve 224 covers opening 226 no airtight seal is formed and air may thus pass through opening 226.

In operation, the bottle having the dispenser mounted on it is placed in the position illustrated in Fig. 15, with the outlet of the dispenser below the inlet. The liquid flows through the inlet 206 through the diagonal passage 204 and thence into the container 202. In the meantime the ball valve 224 has fallen against the restricted opening 222 forming a liquidtight seal to prevent the escape of liquid through the air vent 218. When the container is filled the bottle is turned sufficiently to enable the ball valve 224 to roll away from its seat 222. In this position the mouth of the bottle will be above the bottom, causing the excess liquid to flow back into the bottle, and the open end of the outlet tube 216 faces downwardly. By virtue of the open air vent the liquid will flow freely through the outlet into a suitable glass or other receptacle. Backward flow into the bottle is prevented by the offset diagonal passage 204.

While I have illustrated and described several modifications of my invention, changes and other modifications will be apparent to those skilled in the art, and, therefore, I desire to be limited only by the appended claims.

What I claim as new and useful and desire to secure by United States Letters Patent is:

1. A liquid dispenser adapted to be secured to the mouth of a bottle for dispensing a measured quantity of liquid, comprising an air vented container adapted to hold a measured quantity of liquid, means forming a large diameter inlet to said container contiguous with and in continuous flow relationship with the mouth of the bottle, a perforated tube continuous with said inlet extending into said container and thereby communicating with the interior of said container, a buoyant valve slidable in said tubular continuation and movable to close said inlet when said condenser has been filled with liquid and movable to open position to permit flow of liquid into said container when said container is not filled and the angle of the dispenser is such that liquid will flow into said container from said bottle, an outlet from said container, and a ball valve adapted to close said outlet when the container is in filling position and to open said outlet when said container is in pouring position.

2. A liquid dispenser adapted to be detachably secured to and externally of the mouth of a bottle for dispensing liquid therefrom in predetermined measured quantities having a filling position wherein liquid flows from the bottle into the dispenser and a pouring position wherein liquid pours from the dispenser, comprising an air vented container adapted to hold a measured quantity of liquid, means including a transverse tube forming an inlet to said container, means for connecting said inlet means to said bottle externally of the mouth thereof, said means affording unobstructed communication between the bottle mouth and said inlet means through which liquid may flow from the bottle into said container, a movable inlet valve in said transverse tube adapted to open said inlet when the dispenser is held in filling position and to close said inlet when the dispenser is held in pouring position, means including a second transverse tube parallel to said first tube and forming an outlet from said container, and a movable outlet valve in said second transverse tube adapted to close said outlet when the dispenser is held in filling position and to open said outlet when the dispenser is held in pouring position.

3. A liquid dispenser adapted to be detachably secured to and externally of the mouth of a bottle for dispensing liquid therefrom in predetermined measured quantities having a filling position wherein liquid flows from the bottle into the dispenser and a pouring position whereby liquid pours from the dispenser, comprising an air vented container adapted to hold a measured quantity of liquid, means forming a tubular inlet to said container, means for connecting said inlet means to said bottle externally of the mouth thereof, said means affording unobstructed communication between the bottle mouth and said inlet means through which liquid may flow from the bottle into said container, said tubular inlet having a valve seat, a two position valve member movable in said tubular inlet and adapted to close said inlet when the container is held in pouring position and to open said inlet when the container is held in filling position, means forming an outlet from said container, a valve seat in said outlet, and a two position gravity actuated valve member adapted to close said outlet when the container is held in filling position and to open said outlet when the container is held in pouring position.

4. A liquid dispenser adapted to be detachably secured to the mouth of a bottle for dispensing liquid therefrom in two different predetermined quantities having a filling position wherein liquid flows from the bottle into the dispenser and a first and a second pouring position wherein liquid pours from the dispenser, comprising a container adapted to hold a measured quantity of liquid, means forming an inlet to said container contiguous with and in continuous flow relationship with the mouth of the bottle, a perforated tube continuous with said inlet extending into said container and thereby communicating with the interior of said container, a buoyant valve slidable in said tube and adapted to close said inlet when said container is filled and to permit flow of liquid into said container when the angle of the dispenser is such that liquid will flow into said container from the bottle, means forming a first outlet on the end of the container remote from the point of entry of said inlet, valve means adapted to close said outlet when said dispenser is in the filling position and to open said outlet to permit passage of liquid from said container when said dispenser is in the first pouring position and to vent air into said container when said dispenser is in the second pouring position, and means forming a second outlet from said container adjacent said inlet adapted to vent air into said container when said dispenser is in the first pouring position and partially to empty said container of liquid when said dispenser is in the second pouring position.

5. A liquid dispenser adapted to be secured to the mouth of a bottle for dispensing liquid therefrom into predetermined quantities having a filling position wherein liquid flows from the bottle into the dispenser and a first and second pouring position wherein liquid pours from the dispenser, comprising a container adapted to hold a measured quantity of liquid, a base for said container, means forming an inlet in the base of said container contiguous with and in continuous flow relationship with the mouth of the bottle, a perforated tubular extension of said inlet extending through the base of said container and into the interior thereof thereby communicating with said interior, valve means slidable in said extension to closed position whereby back flow of the liquid from the container into the bottle is prevented, a first outlet on the end of said container remote from said base, valve means adapted to close said outlet when the dispenser is in filling position and to open said outlet when the dispenser is in either pouring position, and a second outlet comprising means forming a passage through said base, an internal tube having a port in the wall thereof inside said container communicating with the internal end of said base passage, and a tube open at both ends externally mounted on said base communicating with the external end of said base passage.

6. The combination claimed in claim 5, including a buoyant valve movably contained within said internal tube.

7. A liquid dispenser adapted to be detachably secured to and externally of the mouth of a bottle for dispensing liquid therefrom in predetermined measured quantities, comprising an air vented container adapted to hold a measured quantity of liquid, tubular means forming an inlet to said container, means for connecting said inlet means to said bottle externally of the mouth thereof, said means affording unobstructed communication between the bottle mouth and said inlet means through which liquid may flow from the bottle into said container, a valve seat in said tubular means, a gravity actuated valve movable in said tubular means and adapted to close said inlet when the bottle is held in one position and to open said inlet when the bottle is held in another position, second tubular means forming an outlet from said container, and a gravity actuated valve movable in said second tubular means and adapted to close said outlet when the bottle is held in one position and to open said outlet when the bottle is held in another position.

8. A liquid dispenser adapted to be detachably secured to the mouth of a bottle for dispensing liquid therefrom, comprising a container adapted to hold a measured quantity of liquid, means forming an inlet to said container adapted to be mounted on the neck of the bottle, means forming a perforated continuation of said inlet extending into said container and thereby communicating with the interior of said container, a buoyant valve moving freely in said continuation adapted to permit flow of liquid into said container until the liquid level floats said valve to an inlet closing position, means forming an outlet on the end of said container opposite the point of entry of said inlet, and valve means adapted to close said outlet when said dispenser is in the filling position.

DWIGHT HESTER.

References Cited in the file of this patent

UNITED STATES PATENTS

| Number | Name | Date |
| --- | --- | --- |
| 697,830 | Franc | Apr. 15, 1902 |
| 788,118 | Perotti | Apr. 25, 1905 |
| 820,679 | Studley | May 15, 1906 |
| 856,543 | Nolan | June 11, 1907 |
| 1,038,465 | Warner et al. | Sept. 10, 1912 |
| 1,039,592 | Ray | Sept. 24, 1912 |
| 1,278,764 | Seiler | Sept. 10, 1918 |
| 2,043,478 | Fine | June 9, 1936 |
| 2,168,050 | Slipikas | Aug. 1, 1939 |
| 2,233,996 | Dent | Mar. 4, 1941 |
| 2,306,309 | Hall | Dec. 22, 1942 |
| 2,387,374 | Watters | Oct. 23, 1945 |

FOREIGN PATENTS

| Number | Country | Date |
| --- | --- | --- |
| 293,361 | Italy | Feb. 19, 1932 |